United States Patent
Han et al.

(10) Patent No.: US 6,704,143 B1
(45) Date of Patent: Mar. 9, 2004

(54) METHOD AND APPARATUS FOR ADJUSTING AN OPTICAL ELEMENT TO ACHIEVE A PRECISE LENGTH

(75) Inventors: Xiaofeng Han, Allentown, PA (US); Boying Barry Zhang, Lawrenceville, NJ (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 38 days.

(21) Appl. No.: 09/694,691

(22) Filed: Oct. 23, 2000

(51) Int. Cl.[7] ............................................... G02B 5/30
(52) U.S. Cl. ..................... 359/499; 359/494; 359/495; 359/496; 359/497; 359/837; 359/498; 385/24
(58) Field of Search ............................... 359/494–497, 359/499, 115, 837, 124, 127, 154, 161, 173, 131; 385/24

(56) References Cited

U.S. PATENT DOCUMENTS

| | | |
|---|---|---|
| 3,529,885 A | 9/1970 | Ammann |
| 4,484,806 A | 11/1984 | Onishi et al. |
| 4,566,761 A | 1/1986 | Carlsen et al. |
| 4,661,738 A | 4/1987 | Skeie |
| 4,685,773 A | 8/1987 | Carlsen et al. |
| 5,040,896 A | 8/1991 | Moslehi |
| 5,042,898 A | 8/1991 | Morey et al. |
| 5,179,424 A | 1/1993 | Lequime et al. |
| 5,268,787 A | 12/1993 | McIntyre |
| 5,486,948 A * | 1/1996 | Imai et al. ................... 359/462 |
| 5,694,205 A | 12/1997 | Gualtieri et al. |
| 5,694,233 A | 12/1997 | Wu et al. |
| 5,724,165 A | 3/1998 | Wu |
| 5,867,291 A | 2/1999 | Wu et al. |
| 5,982,488 A | 11/1999 | Shirasaki |
| 6,005,995 A | 12/1999 | Chen et al. |
| 6,052,223 A | 4/2000 | Yoneyama et al. |
| 6,097,518 A | 8/2000 | Wu et al. |
| 6,236,507 B1 | 5/2001 | Hill et al. |
| 6,301,046 B1 | 10/2001 | Tai et al. |
| 6,337,770 B1 | 1/2002 | Chang et al. |
| 6,396,629 B1 | 5/2002 | Cao |
| 6,510,004 B1 | 1/2003 | Wu et al. ................... 359/498 |
| 6,563,641 B2 | 5/2003 | Zhao |
| 6,587,266 B2 | 7/2003 | Tai et al. |

FOREIGN PATENT DOCUMENTS

| | | | |
|---|---|---|---|
| DE | 40 16 731 A1 | | 11/1991 |
| DE | GB2245381 | * | 2/1992 |
| EP | 60243604 | | 3/1985 |
| EP | 0 362 900 | | 4/1990 |

(List continued on next page.)

OTHER PUBLICATIONS

"Birefringent Interleaver for WDM Fiber Optic Communications"—application 09/694150.

(List continued on next page.)

*Primary Examiner*—Audrey Chang
*Assistant Examiner*—Craig Curtis
(74) *Attorney, Agent, or Firm*—Carlson, Caspers, Vandenburgh & Lindquist

(57) ABSTRACT

In a device and method, the optical path length through an optical element is adjustable with high precision. The optical element has a first segment formed from a first optical material, the first segment having a first face at a first end and a second face at a second end opposing the first face, the second face being non-parallel with the first. The first and second faces are disposed on a beam path. The element also includes a second segment formed from a second optical material, having a third face at a third end and a fourth face at a fourth end opposing the third face, the third face being non-parallel with the fourth face. At least one of the first and second segments is translatable across the beam path so as to change an optical path length through the optical element.

22 Claims, 6 Drawing Sheets

FOREIGN PATENT DOCUMENTS

| | | | |
|---|---|---|---|
| GB | 1241604 | * | 8/1971 |
| JP | 60-239708 | | 11/1985 |
| RU | 1282038 | | 1/1987 |
| WO | WO 99/47955 | | 9/1999 |
| WO | WO 99/49605 | | 9/1999 |
| WO | WO 00/57589 | | 9/2000 |
| WO | WO 067143 A1 | | 9/2001 |

OTHER PUBLICATIONS

"Method and Apparatus for Thermally Compensating a Birefringent Optical Element"—application 09/694148.

Kimura et al., "Temperature compensation of birefringent Optical filters", *Proceeding of the IEEE*, vol. 8, Aug. 1971, pp 1273–1274, XP001078997, paragraph '00II!, paragraph '00IV!; figure 1.

K. W. Chang et al., "Polarization Independent Isolator Using Spatial Walkoff Polarizers", *IEEE Photonics Technology Letters*, 1:3, 68–70 (Mar. 1989).

S. E. Harris et al., "Optical Network Synthesis Using Birefringent Crystals *I. Synthesis of Lossless Networks of Equal–Length Crystals", *Journal of the Optical Society of America*, 54:10, 1267–79 (Oct. 1964).

* cited by examiner

… …

METHOD AND APPARATUS FOR ADJUSTING AN OPTICAL ELEMENT TO ACHIEVE A PRECISE LENGTH

FIELD OF THE INVENTION

The present invention is directed generally to optical devices, and more particularly to optical devices requiring high precision in the length of an optical element.

BACKGROUND

Some optical elements require that the length of the optical path through the element be very precise. For example, the thickness of a retardation wave plate should be precise in order to impose the desired degree of retardation at the wavelength of interest. Manufacturing a retardation plate to a precise thickness is commonplace for zero or low order waveplates, since they are relatively thin. However, manufacturing a high order retardation plate, having a thickness of several mm, to a high tolerance in length is more difficult, which leads to increased costs. Furthermore, once an element is fabricated, the optical path length through the element is typically fixed, and is not adjustable. Therefore, if the element is made to the wrong length, the element has to be scrapped and a new one fabricated.

Therefore, there is a need for a method of inexpensively producing optical elements that a precise optical path length and reduces the need to scrap elements of the wrong optical path length.

SUMMARY OF THE INVENTION

Generally, the present invention relates to a device and method where the optical path length through an optical element is adjustable with high precision. One particular embodiment of the invention is directed to an optical element having a first segment formed from a first optical material, and having a first face at a first end and a second face at a second end opposing the first face, the first and second faces being disposed on a beam path, the second face being disposed at an angle relative to the first face so as to be non-parallel with the first face. The element also includes a second segment formed from a second optical material, and has a third face at a third end and a fourth face at a fourth end opposing the third face, the third and fourth faces being disposed on the beam path, the third face being disposed at an angle relative to the fourth face so as to be non-parallel with the fourth face. At least one of the first and second segments is translatable across the beam path so as to change an optical path length through the optical element.

Another embodiment of the invention is directed to a method for setting an optical path through an optical element. The method includes providing the optical element as at least two segments having an optical beam passing therethrough, each of the at least two segments having at least one face non-perpendicular to the optical beam. The method also includes translating at least one of the at least two segments across the optical beam so as to adjust the optical path length of the optical beam through the element.

Another embodiment of the invention is directed to an optical element having an adjustable optical path length. The invention includes at least two optical transmission segment means for passing a light beam, the light beam passing non-perpendicularly through at least one face of each of the at least two optical transmission segment means. The invention also includes means for translating at least one of the at least two optical transmission segment mean across the optical beam so as to adjust an optical path length of the optical beam passing through the optical element.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1A:
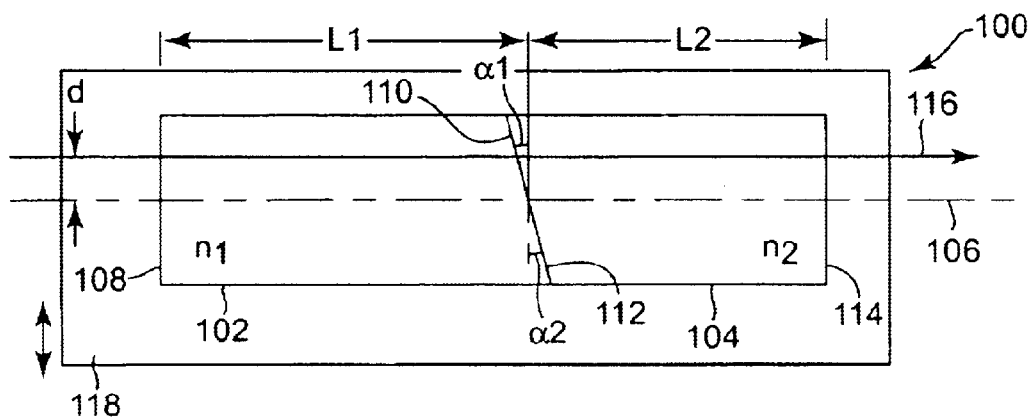
FIGS. 1A–1C schematically illustrate embodiments of two-segment, adjustable path length, optical elements whose segments have different refractive indices, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Many optical systems require high precision in the optical path length that a light beam passes through one or more of the system components. For example, the optical system may include a birefringent polarization rotating element, in which the ordinary ray and extraordinary ray have different optical paths. If a polarization beam analyzer is placed following the birefringent element, the intensity of the transmitted beam is dependent on the wavelength of light and the length of the birefringent element. The wavelengths of light, $\lambda$, that are maximally passed through the analyzer are given by the equation:

$$L\Delta n = m\lambda \qquad (1)$$

where m is an integer, $\Delta n = |n_e - n_o|$, the difference between the refractive indices of the ordinary ray and the extra-ordinary ray; and L is the physical length of the element along the light transmission direction.

In some applications, λ is exactly selected to match a certain standard, such as the grid wavelengths established by the International Telecommunications Union (ITU) for wavelength division multiplexed (WDM) wavelengths for optical communications. Therefore, since the wavelengths passed by the birefringent element are precisely set, the optical path length through the birefringent element is also required to be precise, and the tolerance in the physical length of the element may be smaller than the wavelength. Such a high level of tolerance is difficult to achieve, especially where the length of the optical element is several millimeters or more.

The present invention is directed to an approach for achieving high precision in the optical path length through an optical element. The approach is based on the use of a multi-segmented optical element having non-parallel faces.

One particular embodiment of the invention is schematically illustrated in FIG. 1A. The optical element 100 is composed of two segments 102 and 104 disposed along an optical axis 106. The first segment 102 is formed of a material having a first refractive index $n_1$, and has a first face 108 and a second face 110. The second segment 104 is formed of a second material having a refractive index $n_2$, and has a first face 112 and a second face 114. A light beam 116, displaced from the optical axis 106 by a distance d, passes through the element 100. In this embodiment, the first face 108 of the first segment 102 is an input face to the element and the second face 114 of the second segment 104 is an output face. All the faces 108, 110, 112 and 114 may be provided with anti-reflection coatings to reduce insertion losses of the element 100.

In this particular embodiment, the first face 108 of the first segment 102 and the second face 114 of the second segment 104 each lie substantially perpendicular to the optical axis 106. The second face 110 of the first segment 102 lies at an angle α1 relative to the perpendicular to the optical axis 106 and the first face 112 of the second segment 104 lies at an angle α2 relative to the perpendicular to the optical axis 106.

The optical path, $L_{opt}$, through the element 100 may be expressed as:

$$L_{opt} \approx n_1 L_1 + n_2 L_2 + d(n_2 - n_1)\tan(\alpha) \qquad (2)$$

where the $L_1$ and $L_2$ are the central lengths of the first and second segments 102 and 104 respectively, and α1=α2=α.

The optical path length through the element 100 is adjustable by translating the element in a direction perpendicular to the optical axis so as to vary the distance d, which is the offset from the optical axis 106. Therefore, the precision in the optical path length, $\Delta L_{opt}$, may be expressed as a function of the change in displacement, Δd:

$$\Delta L_{opt} \approx (n_2 - n_1)\tan(\alpha)\Delta d \qquad (3)$$

Thus, the desired precision in optical path length may be achieved by selecting $n_2$, $n_1$, α and Δd.

The angles α1 and α2 may be advantageously selected to reduce any air gap between the first and second segments 102 and 104, and also to produce an output beam that is parallel to the optical axis 106 when the input is parallel to the optical axis 106.

The element 100 may be translated across the beam path using any suitable mechanism. For example, the element 100 may be positioned on a translatable mount 118 which is translated by a screw, a piezo-electric mechanism, or the like, across the beam 116. Also, the beam 116 may be translated relative to the element 100 by adjusting the position of beam steering devices that direct the beam 116 through the element 100.

Figure 1B:
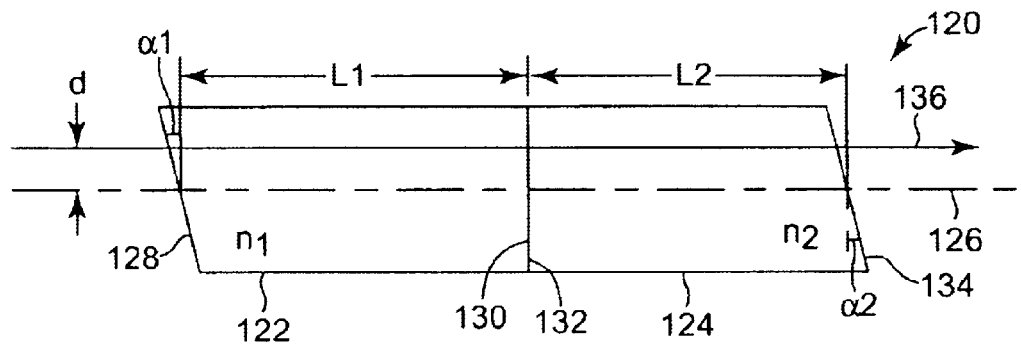

Another particular embodiment of the invention is schematically illustrated in FIG. 1B. The optical element 120 is composed of two segments 122 and 124 disposed along the optical axis 126. The first segment 122 is formed of a material having a first refractive index $n_1$, and has a first face 128 and a second face 130. The second segment 124 is formed of a second material having a refractive index $n_2$, and has a first face 132 and a second face 134. A light beam 136, displaced from the optical axis 126 by a distance d, passes through the element 120.

In this particular embodiment, the first face 128 of the first segment 122 lies at an angle α1 relative to the perpendicular to the optical axis 126 and the second face 134 of the second segment 124 lies at an angle α2 relative to the perpendicular to the optical axis 126. The second face 130 of the first segment 122 and the first face 132 of the second segment 124 each lie approximately perpendicular to the optical axis 126.

The optical path, $L_{opt}$, through the element 120 and the precision of the optical path length, $\Delta L_{opt}$, may be expressed using the same expressions (2) and (3) as provided above, where α1=α2=α.

Figure 1C:
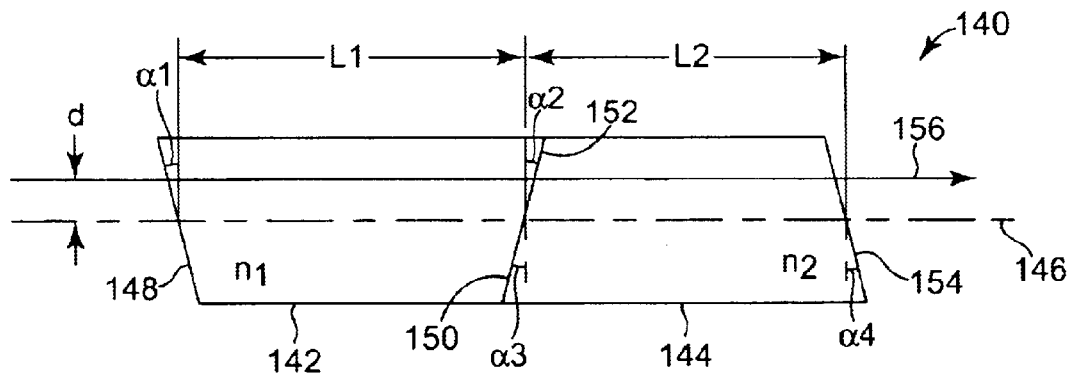

Another particular embodiment of the invention is schematically illustrated in FIG. 1C. The optical element 140 is composed of two segments 142 and 144 disposed along the optical axis 146. The first segment 142 is formed of a material having a first refractive index $n_1$, and has a first face 148 and a second face 150. The second segment 144 is formed of a second material having a refractive index $n_2$, and has a first face 152 and a second face 154. A light beam 156, displaced from the optical axis 146 by a distance d, passes through the element 140.

In this particular embodiment, the first face 148 of the first segment 142 lies at an angle α1 to the perpendicular to the optical axis 146. The second face 150 of the first segment 142 lies at an angle α2 to the perpendicular to the optical axis 146. The sign of the angle α2 is the negative of the sign of the angle α1. The sign of the angle is defined as the direction from the perpendicular to the optical axis 146 to the segment surface. Thus the first face 148 is rotated counter-clockwise relative to the perpendicular to the optical axis 146, while the second face 150 is rotated clockwise relative to the perpendicular to the optical axis 156. Thus, the angles α1 and α2 may be of equal magnitude, but since they are of the opposite sign, the first segment 142 is trapezoidal in shape.

The first face 152 of the second segment 144 lies at an angle α3 to the perpendicular to the optical axis 146. The second face 154 of the second segment 142 lies at an angle α4 to the perpendicular to the optical axis 146. The sign of the angle α4 is the negative of the sign of the angle α3, and so the second segment 142 also is trapezoidal in cross-section.

The optical path, $L_{opt}$, through the element 140 may be expressed as:

$$L_{opt} \approx n_1 L_1 + n_2 L_2 + 2d(n_1 - n_2)\tan(\alpha) \qquad (4)$$

where $L_1$ and $L_2$ are the central lengths of the first and second segments 142 and 144 respectively, and where α1=α2=α3=α4=α.

The precision in the optical path length, $\Delta L_{opt}$, may be expressed as a function of the change in displacement, Δd:

$$\Delta L_{opt} \approx 2(n_1 - n_2)\tan(\alpha)\Delta d \qquad (5)$$

Thus, the desired precision in optical path length may be achieved by selecting $n_2$, $n_1$, $\Delta d$, and the angles of the faces 148, 150, 152 and 154. The angles α1, α2, α3, and α4 are advantageously selected to reduce any air gap between the first and second segments 142 and 144, and also to produce an output beam that is parallel to the optical axis 146 when the input is parallel to the optical axis 146.

Thus, an optical element having an adjustable optical path therethrough may be provided using a two segment approach, some embodiments of which are illustrated in FIGS. 1A–1C. The two segments are formed from materials of different refractive index. The adjustment in optical path length may be provided by translating the element across the direction of the optical beam. Between them, the two segments have at least two faces disposed at an angle relative to the propagation direction of the light. The two segments each have input and output faces that are non-parallel.

It will be appreciated that, where an air gap exists between the segments of a two segment optical element, the light beam may be laterally displaced in the air gap due to refraction at the surfaces of the segments. One way of avoiding this is to use a three-segment optical element: any displacement arising from an air gap between the first and second segments may be compensated for by the translation due to an air gap between the second and third segments.

Figure 2A:
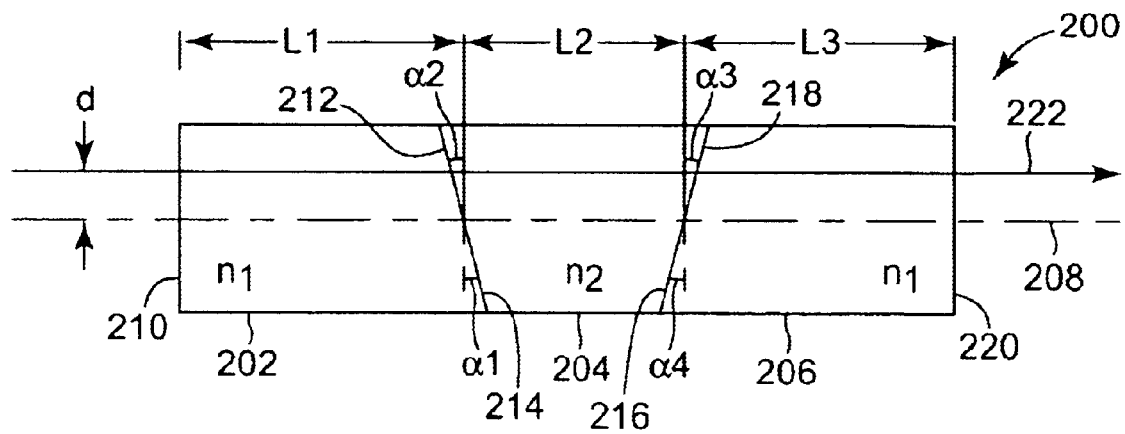
FIGS. 2A and 2B schematically illustrate embodiments of three-segment, adjustable path length, optical elements whose segments have different refractive indices, according to the present invention.

Such an approach to providing an adjustable optical path is illustrated in FIG. 2A. This element 200 is formed from three segments 202, 204 and 206. The first and third elements 202 and 206 may be formed from the same material, having a refractive index $n_1$, while the second element 204 is formed from a second material having a refractive index $n_2$. The lengths of the segments 202, 204 and 206 on the optical axis 208 are L1, L2, and L3 respectively. A light beam 222, displaced from the optical axis 208 by a distance d, passes through the element 200.

The first segment 202 has a first face 210 and a second face 212. The first face 210 is approximately perpendicular to the optical axis 208, while the second face 212 is inclined at an angle α1 to the perpendicular to the optical axis 208. The second segment 204 has a first face 214 and a second face 216. The first face 214 is inclined at an angle α2 relative to the perpendicular to the optical axis 208, while the second face 216 is inclined at an angle α3 relative to the perpendicular to the optical axis 208. The sign of angle α3 is the opposite of the sign of the angle α2, and so the second segment 204 is trapezoidal in cross-section. Also, the sign of the angle α2 is advantageously the same as the sign of the angle α1, so as to minimize any air gap between the first and second segments 202 and 204.

The third segment 206 has a first face 218 and a second face 220. The first face 218 is inclined at an angle α4 relative to the perpendicular to the optical axis 208, while the second face 220 is approximately perpendicular to the optical axis 208. The sign of angle α4 is advantageously the same as the sign of angle α3, so as to minimize any air gap between the second and third segments 204 and 206.

The optical path, $L_{opt}$, through the element 200 may be expressed as:

$$L_{opt} \approx n_1 L_T + n_2 L_2 + 2d(n_2 - n_1)\tan(\alpha) \quad (6)$$

where $L_T = L_1 + L_3$ and α1=α2=α3=α4=α.

The optical path length through the element 200 is adjustable by translating the element 200 perpendicular to the optical 208 axis so as to vary the distance d, which is the offset of the optical beam 222 from the optical axis 208. Therefore, the precision in the optical path length, $\Delta L_{opt}$, may be expressed as a function of the change in displacement, $\Delta d$:

$$\Delta L_{opt} \approx 2(n_2 - n_1)\tan(\alpha)\Delta d \quad (7)$$

Thus, the desired precision in optical path length may be achieved by selecting $n_2$, $n_1$, $\Delta d$ and the angles α1, α2, α3, and α4. The angles α1, α2, α3, and α4 may be advantageously selected to produce an output beam that is parallel to the optical axis 208 when the input is parallel to the optical axis 208.

Figure 2B:
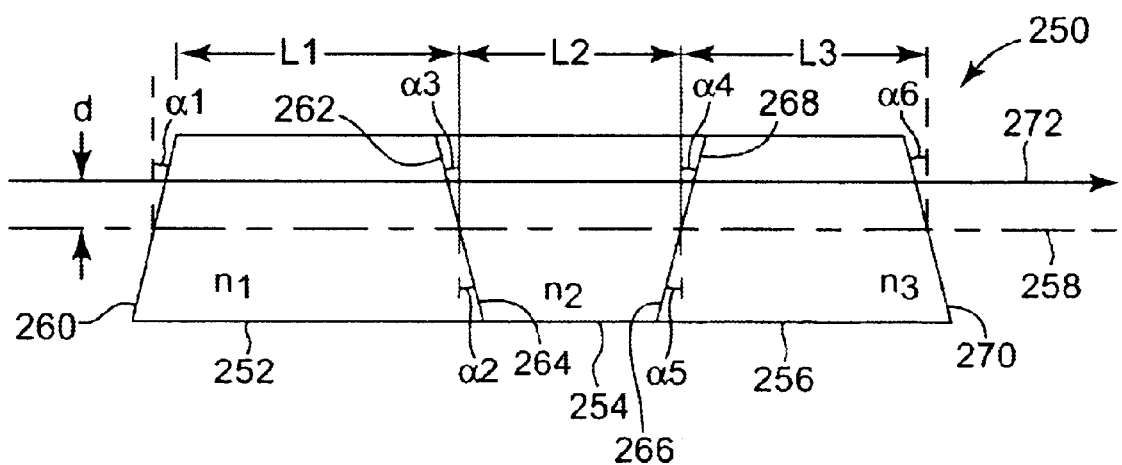

Another embodiment of a three segment optical element 250 is schematically illustrated in FIG. 2B. The element 250 is formed from three segments 252, 254 and 256. The lengths of the segments 252, 254 and 256 on the optical axis 258 are L1, L2, and L3 respectively. A light beam 272, displaced from the optical axis 258 by a distance d, passes through the element 250.

The first segment 252, formed from a first material having a refractive index $n_1$, has a first face 260 and a second face 262. The first face 260 is inclined at an angle α1 relative to the perpendicular to the optical axis 258, while the second face 262 is inclined at an angle α2 to the perpendicular to the optical axis 258. The sign of the angle α1 is opposite the sign of the angle α2, and so the first segment 252 has a trapezoidal cross-section.

The second segment 254 has a first face 264 and a second face 266. The first face 264 is inclined at an angle α3 relative to the perpendicular to the optical axis 258, while the second face 266 is inclined at an angle α4 relative to the perpendicular to the optical axis 258. The sign of angle α4 is the opposite of the sign of the angle α3, and so the second segment 254 is trapezoidal in cross-section. Also, the sign of the angle α3 is advantageously the same as the sign of the angle α2, so as to minimize any air gap between the first and second segments 252 and 254.

The third segment 256 has a first face 268 and a second face 270. The first face 268 is inclined at an angle α5 relative to the perpendicular to the optical axis 258, while the second face 270 is inclined at an angle α6 relative to the perpendicular to the optical axis 258. The sign of angle α5 is advantageously the same as the sign of the angle α4, so as to minimize any air gap between the second and third segments 254 and 256. Furthermore, the sign of the angle α5 is the opposite of the sign of the angle α6, and so the third segment 156 has a trapezoidal cross-section.

The optical path, $L_{opt}$, through the element 250 may be expressed as:

$$L_{opt} \approx n_1 L_1 + n_2 L_2 + n_3 L_3 + 2d(n_2 - n_1 - n_3)\tan(\alpha) \quad (8)$$

where α1=α2=α3=α4=α5=α6=α.

The optical path length through the element 250 is adjustable by translating the element 250 perpendicular to the optical 258 axis so as to vary the distance d, which is the offset of the optical beam 272 from the optical axis 258. Therefore, the precision in the optical path length, $\Delta L_{opt}$, may be expressed as a function of the change in displacement, $\Delta d$:

$$\Delta L_{opt} \approx 2(n_2 - n_1 - n_3)\tan(\alpha)\Delta d \quad (9)$$

Thus, the desired precision in optical path length may be achieved by selecting $n_1$, $n_2$, and $n_3$, $\Delta d$ and the angles α1, α2, α3, α4, α5 and α6. The angles α1, α2, α3, α4, α5 and α6 may be advantageously selected to produce an output beam that is parallel to the optical axis 258 when the input is parallel to the optical axis 258. In the three segment approach, the optical path length through the element may be adjusted by translating the element across the optical beam when there is at least one pair of faces not parallel to the optical axis.

Figure 3A:
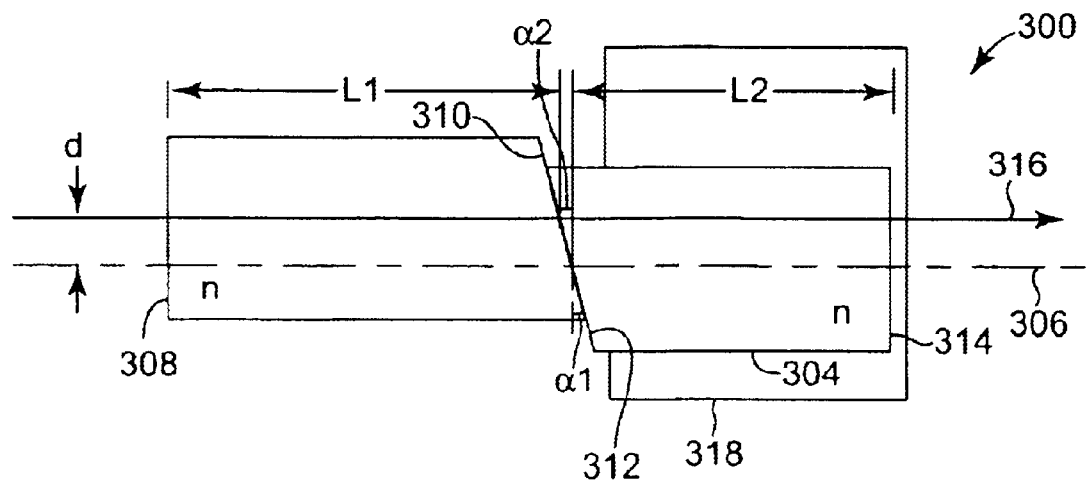
FIGS. 3A–3C schematically illustrate embodiments of two-segment, adjustable path length, optical elements whose segments may the same refractive index, according to the present invention.

Another embodiment of an element 300 having an adjustable optical path is illustrated in FIG. 3A. In this embodiment, the element 300 may be formed of two segments of the same material, having a refractive index n, although they may also be formed of different materials. In this embodiment one of the segments is translated relative to the other, rather than adjusting the optical path length by translating the entire element relative to the optical beam. The element 300 is composed of two segments 302 and 304 disposed along an optical axis 306.

The first segment 302 has a first face 308 that is approximately perpendicular to the optical axis 306. The first segment 302 also has a second face that is inclined at an angle α1 relative to the perpendicular to the optical axis 306. The second segment has a first face 312 inclined at an angle α2 relative to the perpendicular to the optical axis 306, and a first face that is approximately perpendicular to the optical axis 306.

The optical path, $L_{opt}$, through the element 300 may be expressed as:

$$L_{opt}=n[L_1+L_2+d\tan(\alpha)] \quad (10)$$

where the $L_1$ and $L_2$ are the central lengths of the first and second segments 302 and 304 respectively, and α1=α2=α.

The optical path length through the element 300 is adjustable by translating the second segment 304 across the optical axis so as to vary the distance d, which is the displacement distance of the second segment 304 relative to the first segment 302. Therefore, the precision in the optical path length, $\Delta L_{opt}$, may be expressed as a function of the change in displacement, Δd:

$$\Delta L_{opt}=n\tan(\alpha)\Delta d \quad (11)$$

Thus, the desired precision in optical path length may be achieved by selecting n, Δd, α1 and α2.

The angles α1 and α2 may be advantageously selected to reduce any air gap between the first and second segments 302 and 304. The output beam is parallel to the optical axis 106 when the input is parallel to the optical axis 106 when α1=α2.

The translatable segment 304 may be translated across the beam path using any suitable mechanism. For example, the segment 304 may be positioned on a translatable mount 318 which is translated by a screw, a piezo-electric mechanism, or the like, across the beam 316.

Figure 3B:
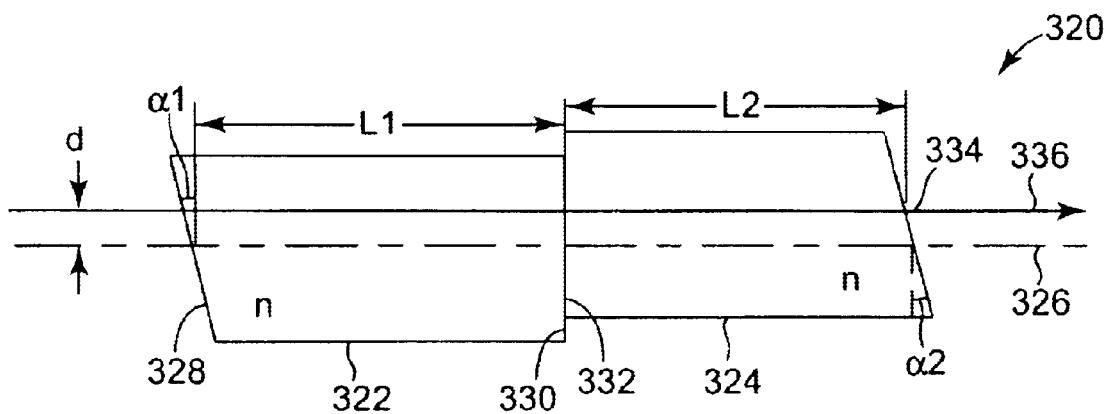

Another particular embodiment of the invention is schematically illustrated in FIG. 3B. The optical element 320 is composed of two segments 322 and 324 disposed along the optical axis 326. The two segments 322 and 324 are formed of the same material, having a refractive index n. A light beam 336 passes through the element 320. The second segment 324 may be displaced relative to the first segment 322 in a direction across the optical axis 326 by a displacement distance, d.

In this particular embodiment, the first face 328 of the first segment 322 lies at an angle α1 relative to the perpendicular to the optical axis 326 and the second face 334 of the second segment 324 lies at an angle α2 relative to the perpendicular to the optical axis 326. The second face 330 of the first segment 322 and the first face 332 of the second segment 324 each lie approximately perpendicular to the optical axis 326.

The optical path, $L_{opt}$, through the element 320 and the precision of the optical path length, $\Delta L_{opt}$, may be expressed using the same expressions (10) and (11) as provided above, where α1=α2=α. The output beam is parallel to the optical axis 106 when the input is parallel to the optical axis 106 when α1=α2.

Figure 3C:
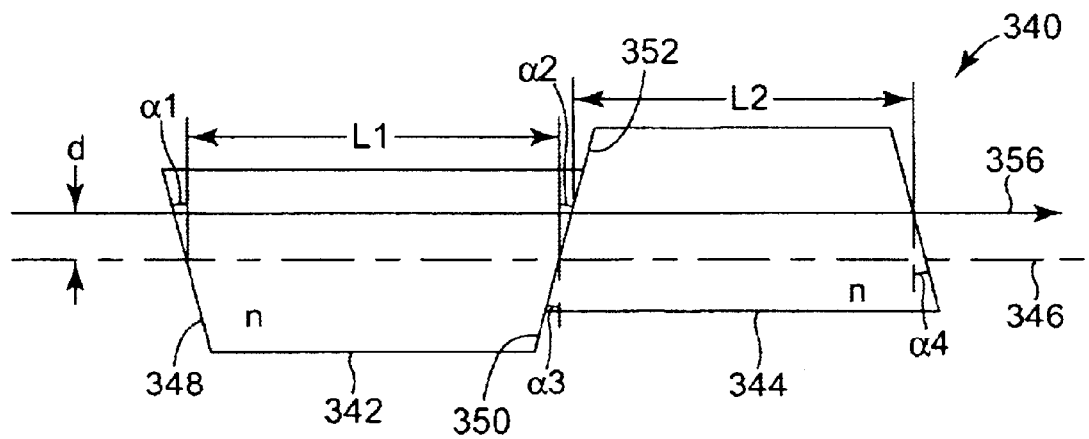

Another particular embodiment of the invention is schematically illustrated in FIG. 3C. The optical element 340 is composed of two segments 342 and 344 disposed along the optical axis 346. A light beam 356 passes through the element 340 in a direction parallel to the optical axis 346. The second segment 344 may be translated relative to the first segment 342 in a direction across the optical axis by a displacement distance, d.

In this particular embodiment, the first face 348 of the first segment 342 lies at an angle α1 to the perpendicular to the optical axis 346. The second face 350 of the first segment 342 lies at an angle α2 to the perpendicular to the optical axis 346. The sign of the angle α2 is opposite the sign of the angle α1, and so the first segment 342 is trapezoidal in cross-section. The first face 352 of the second segment 344 lies at an angle α3 to the perpendicular to the optical axis 346. The second face 354 of the second segment 344 lies at an angle α4 to the perpendicular to the optical axis 346. The sign of the angle α4 is opposite the sign of the sign of the angle α3, and so the second segment 344 also is trapezoidal in cross-section.

The optical path, $L_{opt}$, through the element 340 may be expressed as:

$$L_{opt}=n[L_1+L_2+2d\tan(\alpha)] \quad (12)$$

where $L_1$ and $L_2$ are the central lengths of the first and second segments 342 and 344 respectively, and where α1=α2=α3=α4=α.

The precision in the optical path length, $\Delta L_{opt}$, may be expressed as a function of the change in displacement, Δd:

$$\Delta L_{opt}=2n\tan(\alpha)\Delta d \quad (13)$$

Thus, the desired precision in optical path length may be achieved by selecting Δd and the angles of the faces 348, 350, 352 and 354. The angles α2, and α3 are advantageously selected to be equal so as to reduce any air gap between the first and second segments 342 and 344. The angles α1, α2, α3, and α4 are also advantageously selected to produce an output beam that is parallel to the optical axis 346 when the input to the element 340 is parallel to the optical axis 346.

Thus, a two segment approach, some embodiments of which are illustrated in FIGS. 3A–3C, may be used to provide an optical element having an adjustable optical path therethrough. The two segments may be formed from materials having the same refractive index, although they may also be formed from materials having different refractive indices. The adjustment in optical path length may be provided by translating one of the segments across the direction of the optical beam. Between them, the two segments have at least two faces disposed at an angle relative to the propagation direction of the light. The two segments each have input and output faces that are nonparallel.

Figure 4A:
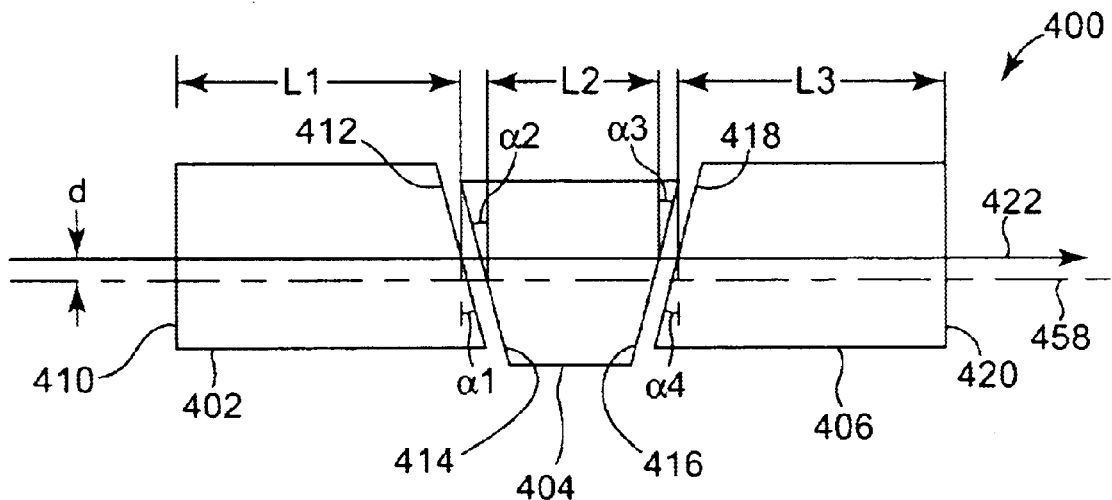
FIGS. 4A and 4B schematically illustrate embodiments of three-segment, adjustable path length, optical elements whose segments may have the same refractive index, according to the present invention.

Another approach to providing an adjustable optical path is illustrated in FIG. 4A. In this embodiment, the optical element 400 is formed from three segments 402, 404 and 406, having the same refractive index, n. The central lengths of the segments 402, 404 and 406 are L1, L2, and L3 respectively. A light beam 422, displaced from the optical axis 408 of the second segment 404 by a distance d, passes through the element 400.

The first segment 402 has a first face 410 and a second face 412. The first face 410 is approximately perpendicular to the optical axis 408, while the second face 412 is inclined at an angle α1 to the perpendicular to the optical axis 408. The second segment 404 has a first face 414 and a second face 416. The first face 414 is inclined at an angle α2 relative to the perpendicular to the optical axis 408, while the second face 416 is inclined at an angle α3 relative to the perpendicular to the optical axis 408. The sign of angle α3 is the opposite of the sign of the angle α2, and so the second segment 404 is trapezoidal in cross-section. Also, the sign of the angle α2 is advantageously the same as the sign of the angle α1, so as to minimize any air gap between the first and second segments 402 and 404.

The third segment 406 has a first face 418 and a second face 420. The first face 418 is inclined at an angle α4 relative to the perpendicular to the optical axis 408, while the second face 420 is approximately perpendicular to the optical axis 408. The sign of angle α4 is advantageously the same as the sign of the angle α3, so as to minimize any air gap between the second and third segments 404 and 406.

The optical path, $L_{opt}$, through the element 400 may be expressed as:

$$L_{opt}=n[L_T+L_2+2d\tan(\alpha)] \quad (14)$$

where $L_T=L_1+L_3$ and $\alpha1=\alpha2=\alpha3=\alpha4=\alpha$.

The optical path length through the element 400 is adjustable by translating one of the segments relative to the others. In the particular case illustrated, the second segment 404 is translated relative to the first and third segments 402 and 406 in a direction perpendicular to the optical 408 axis. The translation varies the distance d, which is the offset of the optical axis 408 of the relative to the beam 422. Therefore, the precision in the optical path length, $\Delta L_{opt}$, may be expressed as a function of the change in displacement, $\Delta d$:

$$\Delta L_{opt}=2n\tan(\alpha)\Delta d \quad (15)$$

Thus, the desired precision in optical path length may be achieved by selecting $\Delta d$ and the angles α1, α2, α3, and α4. The angles α1, α2, α3, and α4 may be advantageously selected to produce an output beam that is parallel to the optical axis 408 when the input is parallel to the optical axis 408.

Figure 4B:
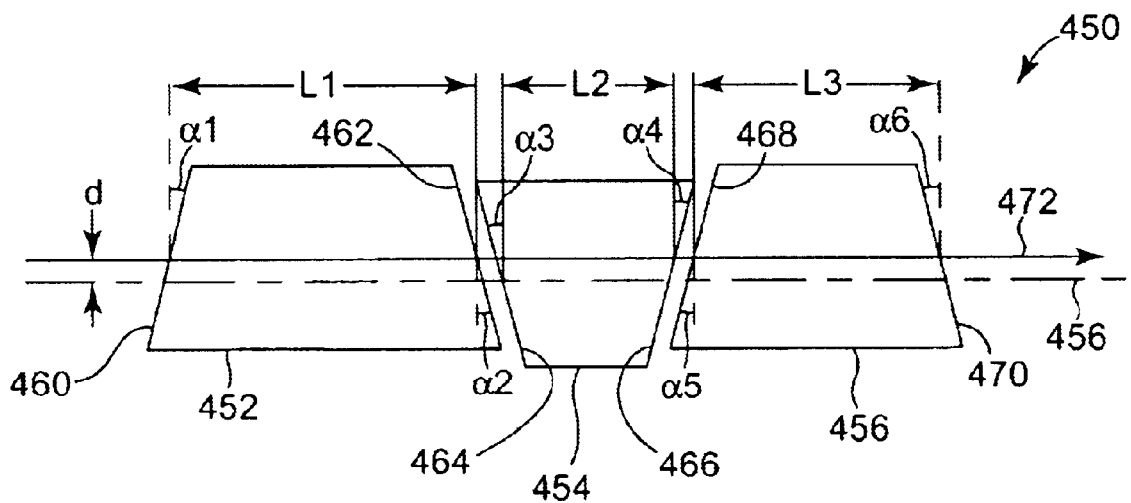

Another embodiment of a three segment optical element 450 is schematically illustrated in FIG. 4B. The element 450 is formed from three segments 452, 454 and 456 having the same refractive index. The central lengths of the segments 452, 454 and 456 are L1, L2, and L3 respectively. A light beam 472, displaced from the optical axis 456 of the translated element 454 by a distance d, passes through the element 450.

The first segment 452 has a first face 460 is inclined at an angle α1 relative to the perpendicular to the optical axis 458. The second face 462 of the first segment 452 is inclined at an angle α2 to the perpendicular to the optical axis 458. The sign of the angle α1 is opposite the sign of the angle α2, and so the first segment 452 has a trapezoidal cross-section.

The second segment 454 has a first face 464 and a second face 466. The first face 464 is inclined at an angle α3 relative to the perpendicular to the optical axis 458, while the second face 466 is inclined at an angle α4 relative to the perpendicular to the optical axis 458. The sign of angle α4 is the opposite of the sign of the angle α3, and so the second segment 454 is trapezoidal in cross-section. Also, the sign of the angle α3 is advantageously the same as the sign of the angle α2, so as to minimize any air gap between the first and second segments 452 and 454.

The third segment 456 has a first face 468 and a second face 470. The first face 468 is inclined at an angle α5 relative to the perpendicular to the optical axis 458, while the second face 470 is inclined at an angle α6 relative to the perpendicular to the optical axis 458. The sign of angle α5 is advantageously the same as the sign of the angle α4, so as to minimize any air gap between the second and third segments 454 and 456. Furthermore, the sign of the angle α5 is the opposite of the sign of the angle α6, and so the third segment 456 has a trapezoidal cross-section.

The optical path, $L_{opt}$, through the element 450 may be expressed as:

$$L_{opt}=n[L_1+L_2+L_3+2d\tan(\alpha)] \quad (16)$$

where $\alpha1=\alpha2=\alpha3=\alpha4=\alpha5=\alpha6=\alpha$, and the path length of the air gaps between the different segments is ignored.

The optical path length through the element 450 is adjustable by translating at least one of the segments 452, 454 and 456 relative to the other segments, so as to vary the distance d, which is the offset of the optical axis 458 of the translated element relative to the optical beam 472. Therefore, the precision in the optical path length, $\Delta L_{opt}$, may be expressed as a function of the change in displacement, $\Delta d$:

$$\Delta L_{opt}=2n\tan(\alpha)\Delta d \quad (17)$$

Thus, the desired precision in optical path length may be achieved by selecting $\Delta d$ and the angles α1, α2, α3, α4, α5 and α6. The angles α1, α2, α3, α4, α5 and α6 may be advantageously selected to produce an output beam that is parallel to the optical axis 458 when the input is parallel to the optical axis 458. In the three segment approach, the optical path length through the element may be adjusted by translating the element across the optical beam when there is at least one pair of faces not parallel to the optical axis.

It will be appreciated, of course, that one segment may also be translated relative to another where the segments are made from different materials.

Although the present invention may be used for adjusting the length of any type of optical element, it is believed to be particularly useful for adjusting the length of a birefringent element to achieve a precise value. One such type of birefringent element where the present invention is particularly useful is the birefringent polarization rotator of a birefringent interleaver, whose operation is now described. The birefringent interleaver is more fully described in U.S. patent application Ser. No. 09/694,150, titled "WDM INTERLEAVER FOR WDM FIBER OPTIC COMMUNICATIONS", filed on Oct. 23, 2000, by B. Barry Zhang and Zhicheng Yang, incorporated herein by reference.

Wavelength division multiplexed (WDM) optical communications systems include several channels of light at different optical frequencies. According to the International Telecommunications Union (ITU) standards, the channels are evenly spaced by frequency. Thus, the mth channel has a frequency given by $v_o+m\Delta v$, where $v_o$ is a lowest channel frequency, $\Delta v$ is the channel separation and m is an integer value ranging from 0 to $m_0$, the upper value. According to some common ITU standards, the channel separation, $\Delta v$, is 100 GHz or 50 GHz. Those channels whose frequencies correspond to the even values of m (m=0, 2, 4 . . . etc.) are typically referred to as the even channels. Likewise, those channels whose frequencies correspond to the odd values of m (m=1, 3, 5 . . . etc.) are typically referred to as the odd channels.

The following discussion describes the different WDM channels in terms of both frequency and wavelength. It will be appreciated that each channel has a unique wavelength and frequency given through the relationship $vm.\lambda m=c$, where νm and λm are, respectively, the frequency and wavelength of the mth channel, and c is the speed of light.

Figure 5:
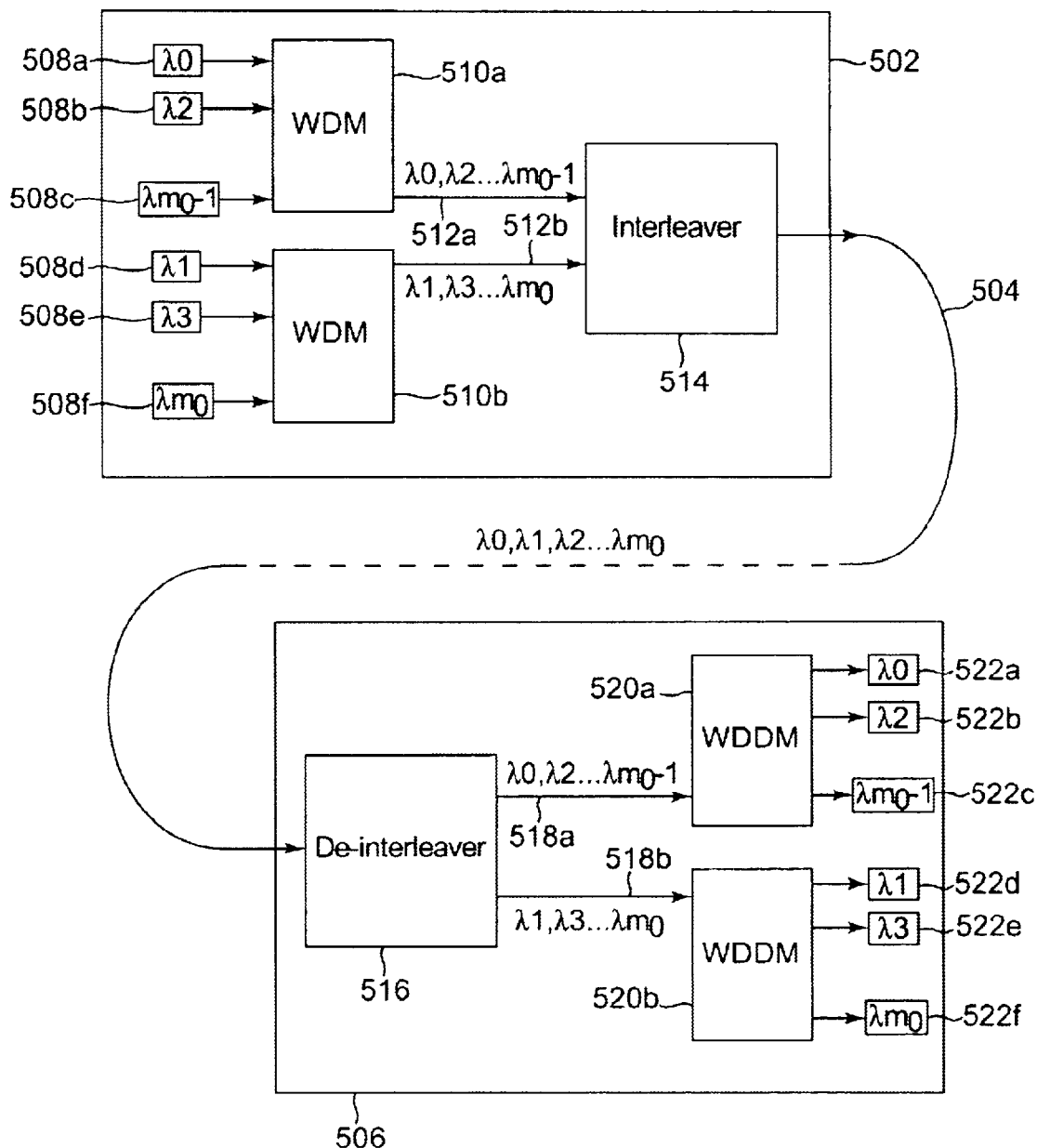
FIG. 5 schematically illustrates an optical communications system.

One particular embodiment of a WDM optical communications system is illustrated in schematic form in FIG. 5. A WDM transmitter 502 directs a WDM signal through a fiber communications link 504 to a WDM receiver 506.

This particular embodiment of WDM transmitter 102 includes a number of light sources 508a–508c that generate light at different wavelengths, λ0, λ2 and λm$_0$–1, corresponding to the even optical channels. The light output from the light sources 508a–508c is combined in a first WDM combiner 510a, to produce a first output 512a. The light in the first output 512a from the first WDM combiner 510a includes light at the wavelengths λ0, λ2 and λm$_0$–1.

The WDM transmitter 502 also includes other light sources 508d–508f that generate light at a different set of wavelengths, λ1, λ3 and λm$_0$ respectively, corresponding to the odd optical channels. The light output from the light sources 508d–508f is combined in a second WDM combiner 510b to produce a second output 512b. The light in the second output 512b from the second WDM combiner 510b includes light at the wavelengths λ1, λ3 and λm$_0$. The channel spacing in each of the first and second outputs 512a and 512b is 2Δν.

The light of the first and second outputs 512a and 512b is combined in the interleaver 514 to produce an interleaved output containing λ0, λ1, λ2 . . . λm$_0$, having a channel separation of Δν. The interleaved output is launched into the fiber communications link 504 for propagation to the WDM receiver 506.

Light sources 508a–508f may be modulated laser sources, or laser sources whose output is modulated, or the like. It will be appreciated that the WDM transmitter 502 may be configured in many different ways to produce the first and second outputs 512a and 512b that are input to the interleaver 514. For example, other types of coupler may be employed to combine the outputs from light sources than a WDM coupler. Furthermore, the WDM transmitter 502 may be equipped with any suitable number light sources for generating the required number of optical channels. For example, there may be twenty or forty optical channels. The WDM transmitter 502 may also be redundantly equipped with additional light sources to replace failed light sources.

Upon reaching the WDM receiver 506, the interleaved signal is passed through a de-interleaver 516, which separates the interleaved signal into an even output signal 518a, containing the even channels, and an odd output signal 518b. The even output signal 518a is passed into a first wavelength division demultiplexer (WDDM) unit 520a which separates the even channels into individual channels that are directed to respective detectors 522a–522c. Likewise, the odd output signal 518b is passed into a second WDDM unit 520b that separates the odd channels into individual channels that are directed to respective detectors 522d–522f.

The exemplary WDM transmitter and receiver architecture illustrated in FIG. 5 permits the user to employ relatively straightforward WDM components for all multiplexing and demultiplexing operations except for interleaving and de-interleaving. This is advantageous in that the component costs for the transmitter 502 and receiver 506 may be kept low, since only the interleaver and de-interleaver have the requirement of operating at the channel separation Δν, while the other components in the transmitter 502 and receiver 506 typically operate at less dense channel separation.

Figure 6A:
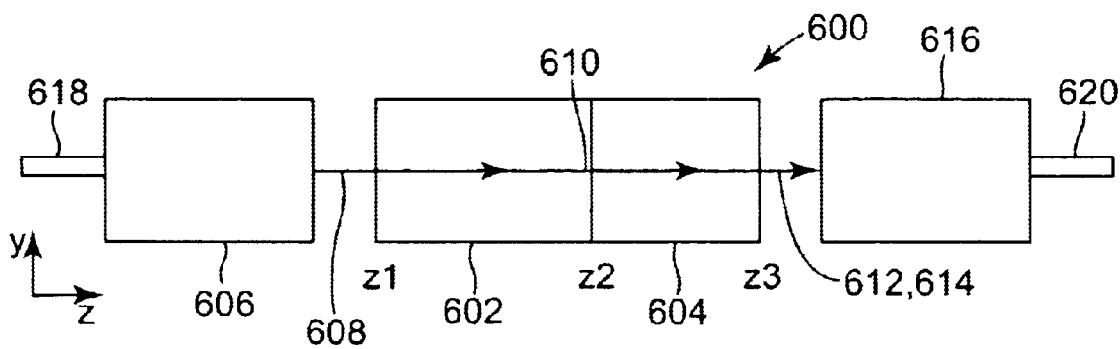
FIGS. 6A and 6C schematically illustrate one particular embodiment of a birefringent interleaver according to the present invention.

One particular embodiment of a birefringent interleaver is schematically illustrated in FIG. 6A. The interleaver 600 includes a birefringent polarization rotating element 602 and a polarization-sensitive beam splitting element 604. The polarization-sensitive beam splitting element 604 may be any suitable element that splits an incoming light beam into beams of orthogonal polarizations, such as a polarizing beamsplitter or a birefringent splitting crystal. A birefringent splitting crystal is particularly advantageous for maintaining small size in devices compatible with fiber optical components.

Figure 6B:
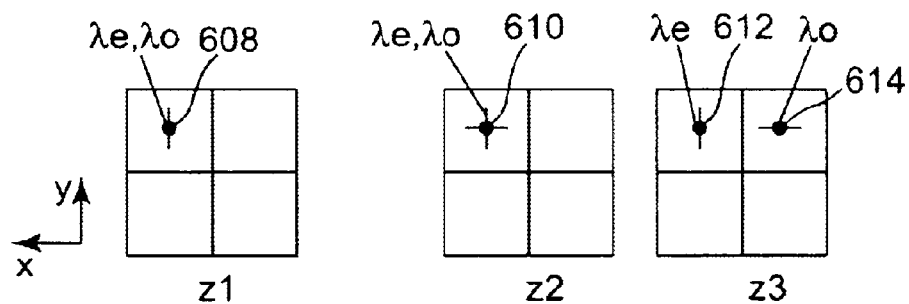
FIGS. 6B and 6D illustrate polarization states of light propagating through the interleaver of FIGS. 6A and 6C respectively.

The interleaver 600 may be used to de-interleave a densely multiplexed signal into two less densely multiplexed signals. De-interleaving with the interleaver 600 is described with reference to FIG. 6B, which illustrates the polarization state and lateral position of the light beam passing through the interleaver 600 at various positions along the interleaver 600. FIG. 6B schematically represents the cross-section of the interleaver 600 as viewed in a direction along the z-axis.

A first optical unit 606 delivers a polarized light beam 608, containing both the even and odd channels, to the interleaver 600, as illustrated for position z1. The even and odd channels are indicated as αe and αo respectively.

The birefringent polarization rotating element 602 is oriented so that its optical axis lies in the x-y plane, the plane perpendicular to the direction that light propagates within the crystal 602. Furthermore, the optical axis of the birefringent polarization rotating element 602 lies at 45° to the y axis, the axis along which the light entering the polarization crystal 602 is polarized. As a result of the particular orientation of the polarization rotating element relative to the z-axis, the propagation direction, the polarization of the light beam 608 is rotated by the polarization rotating element 602.

The length and birefringence of the polarization rotating element 602 are selected so that, after passing through the polarization rotating element 602, the polarizations of the even channels are each effectively rotated to the same angle. Likewise, the polarizations of the odd channels are each effectively rotated to the same angle. However, the angle through which the even channels are rotated differs from the angle through which the odd channels are rotated by approximately 90°. Consequently, at the output of the polarization rotating element 602, position z2, the even channels are polarized parallel to each other and are orthogonal to the polarization of the odd channels.

Although the illustration in FIG. 6B shows that the polarization rotating element 602 effectively rotates the polarization of the odd channels through 90° while effectively not rotating the polarization of the even channels, it will be appreciated that this need not be the case, and other configurations are possible. For example, the polarization of the even channels might be rotated through 90°, while the polarization of the odd channels is effectively unrotated.

The length, L, of the polarization rotating element 602 that is required to effectively rotate the odd channels through an angle 90° different from the even channels is given by:

$$L = c/[2(n_e - n_o)\Delta v] \tag{18}$$

where c is the speed of light, $(n_e - n_o)$ is the difference between the ordinary and extraordinary refractive indices for the crystal, also known as the birefringence, and Δν is the spacing between odd and even channels. Thus, if the polarization rotating element 602 is formed from ortho-vanadate (YVO$_4$), having a birefringence of 0.2039, and the channel separation is 50 GHz, then the length of the polarization rotating element 602 is approximately 14.7 mm. It will be appreciated that any suitable birefringent material may be used, for example lithium niobate. However, YVO$_4$ is particularly advantageous since its birefringence is high, which reduces the length of crystal required for the polarization rotating element 602, thus making the overall length of the interleaver 600 shorter.

After leaving the polarization rotating element 602, the polarization rotated beam 610 enters the polarization-sensitive beam splitting element 604, where the two polarizations are split from each other. In the particular embodiment illustrated, the polarization-sensitive beam splitting element 604 is a birefringent splitting crystal, where the entering beam 610 is split into an ordinary ray 612 and an extraordinary ray 614 by the birefringent walk-off. At the output from the birefringent splitting crystal 604, the odd channels, propagating as the extraordinary ray 614, have been separated from the even channels, propagating as the ordinary ray 612, as shown for position z3. The two beams 612 and 614 from the birefringent splitting crystal 604 may then be directed to two different output fibers 620 by the second optical unit 616.

One particular embodiment of birefringent splitting crystal 604 has its optical axis at −45° to the z-axis in the x-z plane. As is the case with the polarization rotating element 602, the birefringent splitting crystal 604 may be formed from any suitable birefringent material, such as lithium niobate or ortho-vanadate. However, since the walk-off angle between the ordinary and extraordinary rays is dependent on the magnitude of the birefringence, a highly birefringent material, such as ortho-vanadate, is advantageous since it reduces the length of the crystal required to obtain separation between the ordinary and extraordinary beams 612 and 614.

The first optical unit 606 may be coupled to receive input light from an external optical fiber 618. The first optical unit 606 may also include one or more collimating lenses to collimate the light from the fiber 618 before passage through the interleaver 600.

Figure 6C:
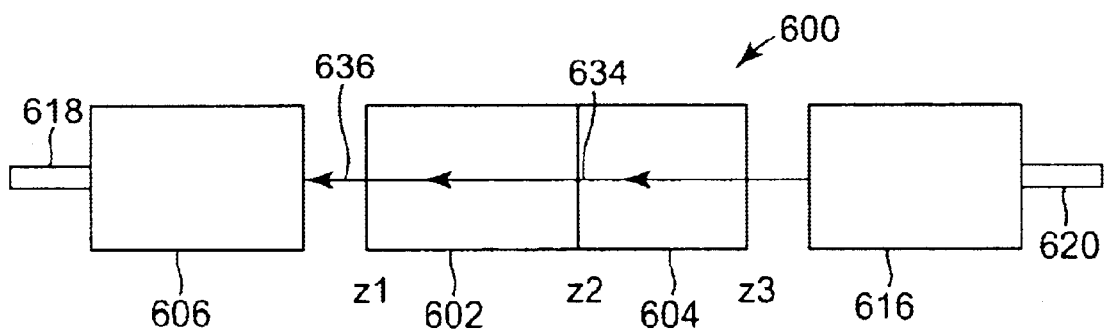
Figure 6D:
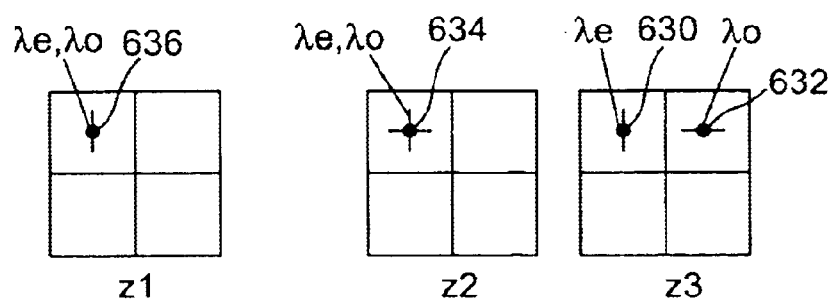

The birefringent interleaver 600 is able to perform a de-interleaving operation, as has just been described, in other words it separates the odd channels from the even channels. It will be appreciated that the interleaver may also perform an interleaving operation, in other words combining a beam that includes odd channels with a beam that includes oven channels, to produce a single beam that includes both odd and even channels. This may be achieved by passing light through the interleaver 600 in the backwards direction, as is now discussed with reference to FIGS. 6C and 6D. Two orthogonally polarized beams 630 and 632 are directed at the birefringent splitting crystal 604 from the second optical unit 616. The first polarized beam 630 contains the even channels, while the second polarized beam 632 contains the odd channels. The beams 630 and 632 are separate upon entering the birefringent splitting crystal 604. One of the beams 630 and 632, in this case the second beam 632, enters the birefringent splitting crystal 604 as an extraordinary beam and the other beam, in this case beam 630, enters as an ordinary beam, as shown for position z3. Passage through the birefringent splitting crystal 604 in the reverse direction results in the extraordinary beam and ordinary beam combining into a single beam 634 at position z2. The single beam 634 contains the odd channels having one polarization and the even channels having the orthogonal polarization, as shown for position z2.

The single beam 634 then passes through the polarization rotating element 602. The polarization rotating element 602 effectively rotates the polarization of the odd channels through a first angle and the polarization of the even channels through a second angle different from the first angle by approximately 90°. Consequently, after propagating through the polarization rotating element 602, the beam 636 is polarized and contains all the even and odd channels. The beam 636 may then pass through the first optical unit 606 to the fiber 618.

Thus, it will be appreciated that the interleaver 600 may be operated to interleave odd and even channels when the light is passed therethrough in one direction and to de-interleave the odd and even channels when the light passes through the interleaver 600 in the opposite direction.

An important feature of the invention is the length of the polarization rotating element. If the length is too long, then the even channels will be rotated to different angles rather than to the same angle, and the odd channels will be rotated to different angles rather than the same angle. One measure of the precision of the length of the crystal is how much the polarization rotation is different for the first and last channels of a WDM signal, where the difference is measured in terms of dB in the interleaved signal. For example, to achieve 0.1 dB flatness over the width of an 80 channel signal, with an inter-channel spacing of 50 GHz, the length of the crystal should be correct to within about 300 nm.

The embodiments of length-adjustable optical elements discussed above can easily achieve the precision required to obtain the correct optical path length through the polarization rotating element. For example the precision afforded by the optical element 100 of FIG. 1A was given as:

$$\Delta L_{opt} = (n_2 - n_1)\tan(\alpha)\Delta d \qquad (3)$$

If the difference in refractive index between the two materials is 0.2 and the angle α is 1°, then we have $\Delta L_{opt}=0.0035\Delta d$. Thus for a lateral shift of the optical element of $\Delta d=0.1$ mm, there is a concomitant change in the optical path length of the element of $\Delta L_{opt}=350$ nm which is sufficient to achieve the precision in the length of the polarization rotating element described above.

In another example, the precision afforded by the optical element 400 in FIG. 4A was given as:

$$\Delta L_{opt} = 2n \tan(\alpha)\Delta d \qquad (15)$$

If we assume that n=2.0 and α=0.1° then, in this embodiment, $\Delta L_{opt}=0.007\Delta d$, i.e. for a lateral shift of $\Delta d=0.1$ mm, there is a concomitant change in the effective length of the $\Delta L_{opt}=700$ nm.

The effect of temperature on the operation of a multi-segmented polarization rotation element is described in U.S. patent application Ser. No. 09/694,148, titled "METHOD AND APPARATUS FOR THERMALLY COMPENSATING A BIREFRINGENT OPTICAL ELEMENT", filed on Oct. 23, 2000, by Xiaofeng Han and Zhicheng Yang, incorporated herein by reference. Judicious selection of the segment lengths, where different birefringent materials are used, may lead to reduction, if not cancellation, of the thermal effects on the birefringent path length through the polarization rotation element.

The figures described above show some embodiments of the present invention. It will be appreciated that various modifications and changes may be made to the illustrated embodiments while remaining within the scope of the invention. For example, the light beam may not pass out of the element in the same direction at which it entered if the element is formed from two segments of different materials, where each segment has two faces that are exactly parallel to the respective two faces of the other segment. In such a case, the angle of the angled face of one segment may be set to be close to, but different from, the angle of the respective angled face of the other segment in order to ensure that the beam leaves the element in a direction parallel to the direction of entry. Thus, referring once more to FIG. 1A, angle α1 may be said to be approximately equal to α2. The difference between α1 and α2 is dependent, at least in part, on the difference between the refractive indices n1 and n2.

Furthermore, it will also be appreciated that although the figures show straight light beams passing through the different elements, the light beams are refracted on passing through a face that is not perpendicular the direction of propagation.

As noted above, the present invention is applicable to optical systems and is believed to be particularly useful for providing adjustment in the optical path length of any element whose optical path length requires high precision. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. An optical element, comprising:
   a first segment formed from a first birefringent optical material, and having a first face at a first end and a second face at a second end opposing the first face, the first and second faces being disposed on a beam path, the second face being disposed at an angle relative to the first face so as to be non-parallel with the first face;
   a second segment formed from a second birefringent optical material different from the first optical material, and having a third face at a third end and a fourth face at a fourth end opposing the third face, the third and fourth faces being disposed on the beam path, the third face being disposed at an angle relative to the fourth face so as to be non-parallel with the fourth face; and
   a translation unit, wherein the first and second segments are disposed on the translation unit to translate the first and second segments across the beam path.

2. An optical device as recited in claim 1, wherein the first segment has a first crystal optical axis oriented approximately perpendicular to the beam path, and the second segment has a second crystal optical axis oriented approximately perpendicular to the beam path.

3. An optical device as recited in claim 1, wherein the first and fourth faces are approximately perpendicular to the beam path.

4. An optical device as recited in claim 3, wherein the first and fourth faces are device input/output faces.

5. An optical device as recited in claim 1, wherein the second and third faces are disposed at a first angle having different signs relative to the beam path.

6. An optical device as recited in claim 5, wherein the second and third faces are device input/output faces.

7. An optical device as recited in claim 1, wherein the second face is disposed at a second angle relative to the beam path and the third face is disposed at approximately the second angle relative to the beam path but with an angle sign opposite the angle sign of the second face.

8. An optical device as recited in claim 1, wherein the first face is approximately parallel to the fourth face and the second face is approximately parallel to the third face.

9. An optical device as recited in claim 8, wherein the second face is disposed proximate the third face, the first and fourth faces are disposed at approximately a third angle relative to the beam path and the second and third faces are disposed at approximately a fourth angle relative to the beam path, the first, second, third and fourth faces being non-perpendicular to the beam path.

10. An optical device as recited in claim 9, wherein the third angle is equal in magnitude to the fourth angle and has a sign opposite to the sign of the fourth angle.

11. An optical device as recited in claim 1, further comprising a third segment formed from the first birefringent optical material, and having a fifth face at a fifth end and a sixth face at a sixth end opposing the fifth face, the fifth and sixth faces being disposed on the beam path, the fifth face being disposed at an angle relative to the sixth face so as to be non-parallel with the sixth face.

12. An optical device as recited in claim 11, wherein the second segment is disposed between the first and third segments, the first and sixth faces are approximately parallel, the second and third faces are approximately parallel and the fourth and fifth faces are approximately parallel.

13. An optical device as recited in claim 11, wherein the first and sixth faces are device input/output faces, the second face is disposed proximate the third face and the fourth face is disposed proximate the fifth face.

14. An optical device as recited in claim 12, wherein the second and third faces are disposed at a third angle relative to the beam path and the fourth and fifth faces are disposed at the third angle to the beam path, the sign of the third angle of the fourth and fifth faces being opposite the sign of the third angle of the second and third faces.

15. An optical device as recited in claim 12, wherein the first and sixth faces are disposed approximately perpendicular to the beam path.

16. An optical device as recited in claim 1, wherein the optical path length is a birefringent path, and translation of at least one of the segments results in a change in a difference between path lengths of light on the beam path in a first polarization state and light on the beam path in a second polarization state orthogonal to the first polarization state.

17. A method for setting an optical path through an optical element, comprising:
   providing the optical element as at least two birefringent segments having an optical beam passing therethrough, each of the at least two birefringent segments having at least one face non-perpendicular to the optical beam, the at least two birefringent segments being formed from at least two different optical materials; and
   translating the at least two birefringent segments across the optical beam so as to adjust the optical path length of the optical beam through the element.

18. A method as recited in claim 17, wherein translating the at least one of the at least two birefringent segments results in changing a difference between path lengths of light of the optical beam in a first polarization state and light of the optical beam in a second polarization state orthogonal to the first polarization state.

19. An optical element with an adjustable optical path length, comprising:
   at least two birefringent optical transmission segment means formed from at least two birefringent materials for passing a light beam, the light beam passing non-perpendicularly through at least one face of each of the at least two optical transmission segment means; and
   means for translating the at least two birefringent optical transmission segment means across the optical beam so as to adjust an optical path length of the optical beam passing through the optical element.

20. An optical element, comprising:

a first segment formed from a first birefringent optical material, and having a first face at a first end and a second face at a second end opposing the first face, the first and second faces being disposed on a beam path, the second face being disposed at an angle relative to the first face so as to be non-parallel with the first face;

a second segment formed from a second birefringent optical material, and having a third face at a third end and a fourth face at a fourth end opposing the third face, the third and fourth faces being disposed on the beam path, the third face being disposed at an angle relative to the fourth face so as to be non-parallel with the fourth face; and a third segment formed from the first birefringent optical material, and having a fifth face at a fifth end and a sixth face at a sixth end opposing the fifth face, the fifth and sixth faces being disposed on the beam path, the fifth face being disposed at an angle relative to the sixth face so as to be non-parallel with the sixth face; and a translation unit to translate the first, second and third segments across the beam path so as to change an optical path length through the optical element.

21. An optical device as recited in claim 20, wherein the first segment has a first crystal optical axis oriented approximately perpendicular to the beam path, and the second segment has a second crystal optical axis oriented approximately perpendicular to the beam path.

22. An optical device as recited in claim 20, wherein the first segment is formed from a first birefringent material and the second segment is formed from a second birefringent material different from the first birefringent material.

* * * * *